US009253554B2

(12) United States Patent
Goswami et al.

(10) Patent No.: US 9,253,554 B2
(45) Date of Patent: Feb. 2, 2016

(54) TIME TO TIME-FREQUENCY MAPPING AND DEMAPPING FOR ETHERNET PASSIVE OPTICAL NETWORK OVER COAX (EPOC)

(71) Applicant: Broadcom Corporation, Irvine, CA (US)

(72) Inventors: Sanjay Goswami, Santa Rosa, CA (US); Avi Kliger, Ramat Gan (IL); Edward Boyd, Petaluma, CA (US); Yitshak Ohana, Givat Zeev (IL); Leo Montreuil, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 185 days.

(21) Appl. No.: 14/029,180

(22) Filed: Sep. 17, 2013

(65) Prior Publication Data
US 2014/0079399 A1    Mar. 20, 2014

Related U.S. Application Data

(60) Provisional application No. 61/702,108, filed on Sep. 17, 2012, provisional application No. 61/702,113, filed on Sep. 17, 2012, provisional application No. 61/702,144, filed on Sep. 17, 2012, provisional application No. 61/724,399, filed on Nov. 9, 2012.

(51) Int. Cl.
*H04Q 11/00* (2006.01)
*H04L 5/00* (2006.01)

(52) U.S. Cl.
CPC ............ *H04Q 11/0067* (2013.01); *H04L 5/001* (2013.01); *H04L 5/0007* (2013.01); *H04Q 2213/1301* (2013.01); *H04Q 2213/13389* (2013.01)

(58) Field of Classification Search
None
See application file for complete search history.

(56) References Cited

U.S. PATENT DOCUMENTS

2003/0091045 A1    5/2003  Choi et al.
2006/0271988 A1   11/2006  Chapman et al.
(Continued)

OTHER PUBLICATIONS

International Search Report with Written Opinion directed toward related International Application No. PCT/US2013/060129, mailed Jan. 3, 2014 from the ISA/US, Alexandria, VA; 15 pages.
(Continued)

*Primary Examiner* — Faruk Hamza
*Assistant Examiner* — Cassandra Decker
(74) *Attorney, Agent, or Firm* — Sterne, Kessler, Goldstein & Fox P.L.L.C.

(57) ABSTRACT

Embodiments include, but are not limited to, systems and methods for enabling Orthogonal Frequency Division Multiple Access (OFDMA) in the upstream in an Ethernet Passive Optical Network over Coax (EPoC) network. Embodiments include systems and methods for translating Ethernet Passive Optical Network (EPON) upstream time grants to OFDMA resources represented by individual subcarriers of an upstream OFDMA frame. In an embodiment, the translation of EPON upstream time grants to OFDMA resources ensures that Coaxial Network Units (CNUs) sharing an OFDMA frame do not use overlapping subcarriers within the frame. Embodiments further include systems and methods for timing upstream transmissions by the CNUs in order for the transmissions to be received within the same upstream OFDMA frame at a Fiber Coax Unit (FCU). Embodiments further include systems and methods for re-generating a data burst from OFDMA resources for transmission from the FCU to an Optical Line Terminal (OLT).

20 Claims, 14 Drawing Sheets

(56) References Cited

U.S. PATENT DOCUMENTS

| | | | |
|---|---|---|---|
| 2010/0111116 A1* | 5/2010 | Yu | H04J 3/0658 370/503 |
| 2011/0001833 A1 | 1/2011 | Grinkemeyer et al. | |
| 2011/0058813 A1 | 3/2011 | Boyd et al. | |
| 2012/0008937 A1 | 1/2012 | Cheng et al. | |
| 2012/0148245 A1 | 6/2012 | Bowler et al. | |
| 2012/0250491 A1* | 10/2012 | Goodson | H04N 3/32 370/201 |
| 2013/0236177 A1* | 9/2013 | Fang | H04L 12/2801 398/66 |
| 2013/0343753 A1* | 12/2013 | Pietsch | H04J 14/08 398/41 |
| 2014/0010539 A1* | 1/2014 | Varanese | H04J 3/1694 398/66 |

OTHER PUBLICATIONS

Yeung, K., "Detailed OFDM Modeling in Network Simulation of Mobile Ad Hoc Networks," A thesis submitted in partial satisfaction for the degree Master of Science in Computer Science, University of California Los Angeles (2003).

International Preliminary Report on Patentability directed to related International Application No. PCT/US2013/060129, mailed Mar. 26, 2015; 9 pages.

* cited by examiner

TIME TO TIME-FREQUENCY MAPPING AND DEMAPPING FOR ETHERNET PASSIVE OPTICAL NETWORK OVER COAX (EPOC)

CROSS-REFERENCE TO RELATED APPLICATION(S)

The present application claims the benefit of U.S. Provisional Application No. 61/702,108, filed Sep. 17, 2012, U.S. Provisional Application No. 61/702,113, filed Sep. 17, 2012, U.S. Provisional Application No. 61/702,144, filed Sep. 17, 2012, and U.S. Provisional Application No. 61/724,399, filed Nov. 9, 2012, all of which are incorporated herein by reference in their entireties.

TECHNICAL FIELD

The present disclosure relates generally to Ethernet Passive Optical Network over Coax (EPoC), and more particularly to time to time-frequency mapping/demapping and upstream bit loading profile balancing for Orthogonal Frequency Division Multiple Access (OFDMA) support.

BACKGROUND

Background Art

In a hybrid fiber-coax (HFC) network, the Medium Access Control (MAC) level upstream multi-access method may be different than the physical layer (PHY) level upstream multi-access method over the Ethernet Passive Optical Network over Coax (EPoC) portion of the network. For example, at the MAC level, upstream access is typically based on Ethernet Passive Optical Network (EPON) Time Division Multiple Access (TDMA). At the PHY level, however, a multi-subcarrier multiple access technique, such as Orthogonal Frequency Division Multiple Access (OFDMA) may be used.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
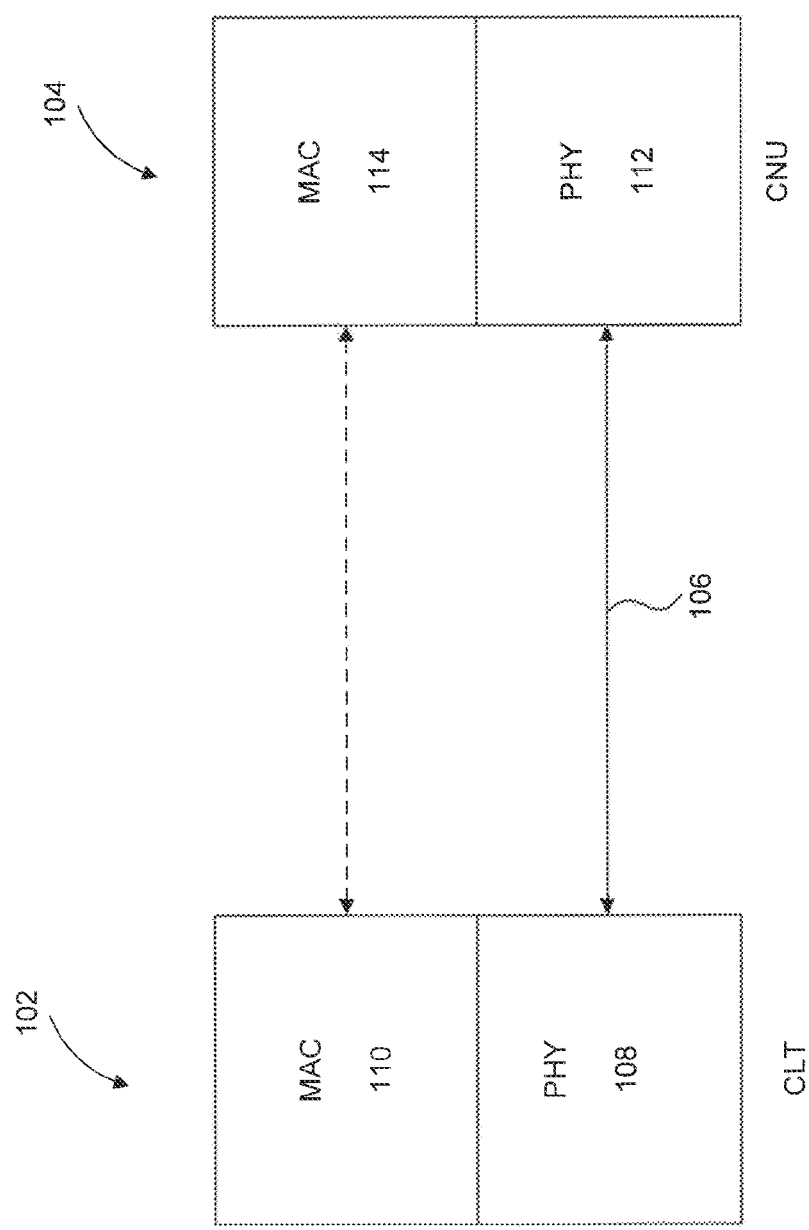
FIG. 1 illustrates an example cable network architecture according to an embodiment.

FIG. 1 illustrates an example cable network architecture 100 according to an embodiment. Example cable network architecture 100 is provided for the purpose of illustration only and is not limiting of embodiments. Embodiments described herein can be implemented in a cable network architecture, such as cable network architecture 100.

As shown in FIG. 1, example network architecture 100 includes a CLT 102 and a CNU 104, coupled via a distribution network 106. Distribution network 106 can include a coaxial cable and optionally other coaxial components (e.g., splitters, amplifiers, etc.). As would be understood by a person of skill in the art based on the teachings herein, CLT 102 can serve multiple CNUs, such as CNU 104, in a point-to-multipoint topology.

CLT 102 and CNU 104 implement respective Medium Access Control (MAC) layers 110 and 114. According to embodiments, MAC layers 110 and 114 can be, without limitation, Data Over Cable Service Interface Specification (DOCSIS) or Ethernet Passive Optical Network (EPON) MAC layers. An end-to-end MAC link can be established between MAC layers 110 and 114 as shown in FIG. 1.

CLT 102 and CNU 104 implement physical layers (PHYs) 108 and 112 respectively. PHYs 108 and 112 establish a PHY link over distribution network 106, which can be transparent to upper layers such as the MAC layer. PHYs 108 and 112, can be, without limitation, Ethernet Passive Optical Network over Coax (EPoC) PHYs. In an embodiment, PHY 108 includes a service provider PHY and PHY 112 includes a subscriber PHY.

Figure 2:
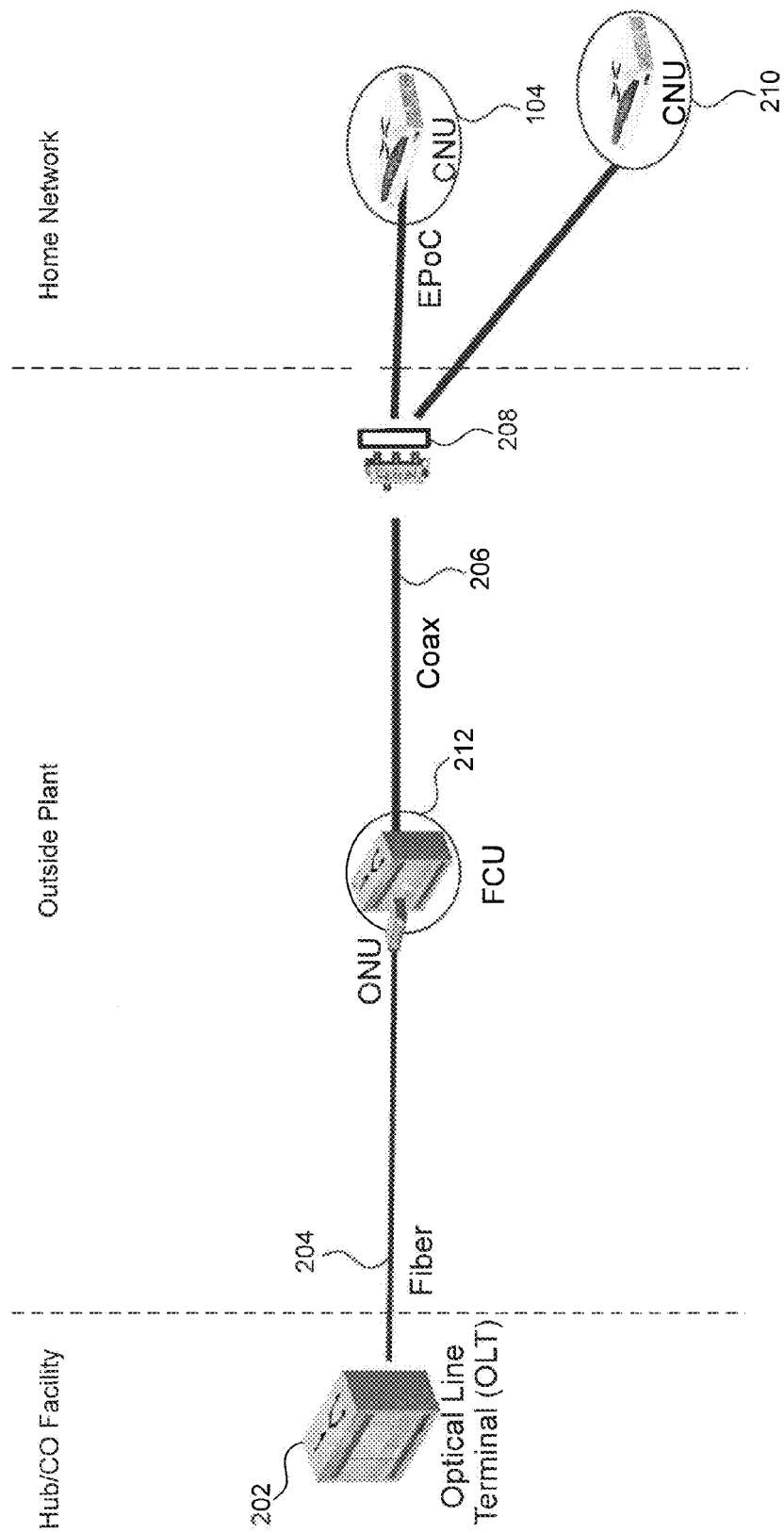
FIG. 2 illustrates another example cable network architecture according to an embodiment.

FIG. 2 illustrates another example cable network architecture 200 according to an embodiment. Example cable network architecture 200 is provided for the purpose of illustration only and is not limiting of embodiments. Embodiments described herein can be implemented in a cable network architecture, such as cable network architecture 200. Cable network architecture 200 is a hybrid fiber coaxial (HFC) architecture.

As shown in FIG. 2, example cable network architecture 200 includes an Optical Line Terminal (OLT) 202, which is coupled via a fiber optic line 204, to a Fiber Coax Unit (FCU) 212. FCU 212 is coupled via a coaxial cable 206, and an intervening splitter 208, to CNU 104 and a CNU 210. FCU 212 can have different configurations according to embodiments, two of which are described in example architectures 1200A and 1200B of FIGS. 12A and 12B.

Figure 12A:
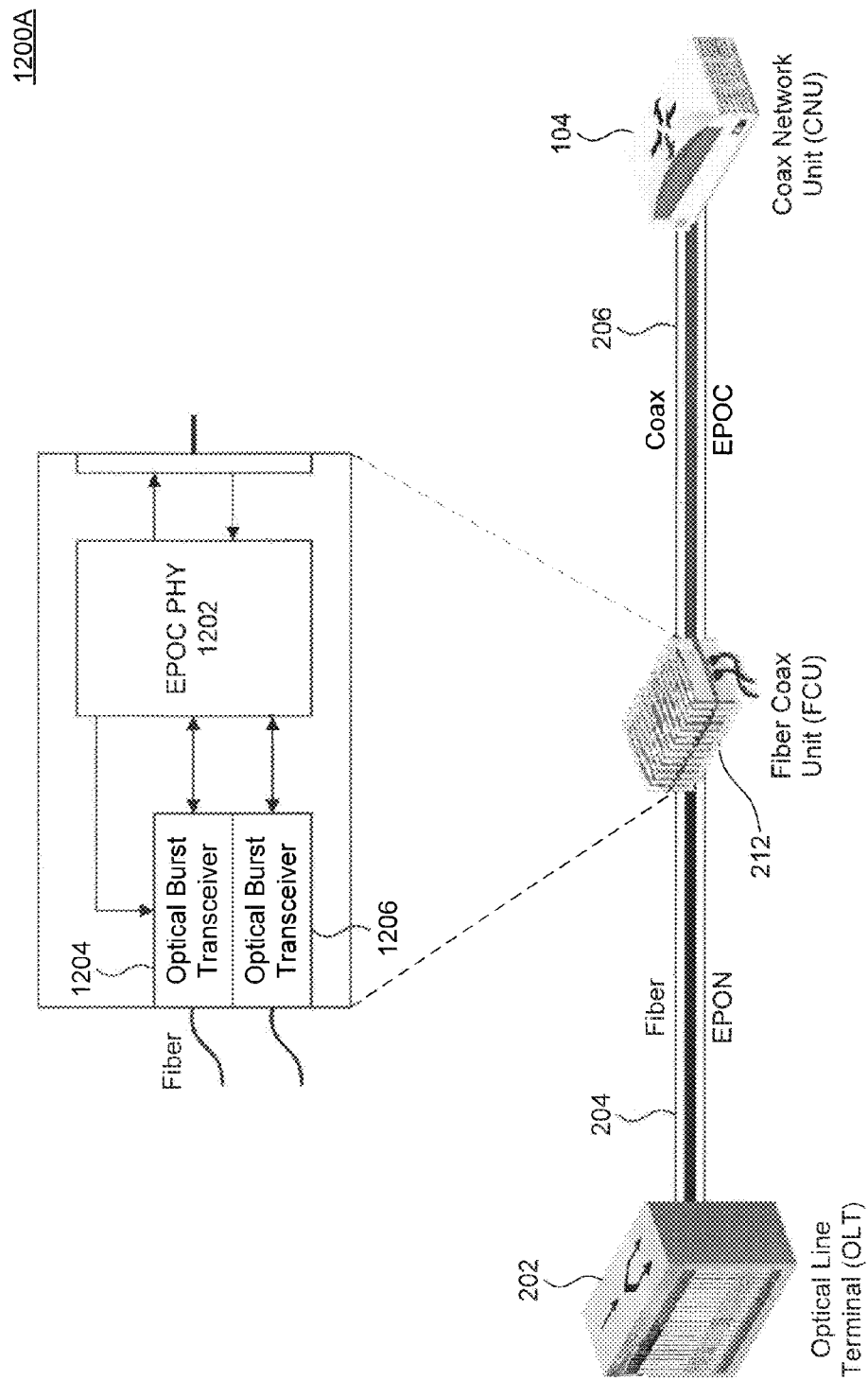
FIG. 12A illustrates another example cable network architecture according to an embodiment.

In example architecture 1200A illustrated in FIG. 12A, FCU 212 is in a managed repeater configuration and includes an EPoC PHY 1202, an optical burst transceiver 1204, and optical burst transceiver 1206. FCU 212 can also include in this configuration an EPON MAC (not shown), which can be used for management. In this configuration, FCU 212 serves to convert at the PHY level between optical and coax. In an embodiment, FCU 212 includes a media converter for converting signals at the PHY level from optical to electrical, and vice versa. According to this configuration, an upstream transmission request from a CNU, such as CNU 104, is received by FCU 212, converted from coax to optical, and then transmitted to OLT 202. OLT 202 issues an EPON time grant in response to the request. The EPON time grant is converted from optical to coax at FCU 212 and then forwarded to CNU 104, which then transmits in the upstream in accordance with the EPON time grant.

Figure 12B:
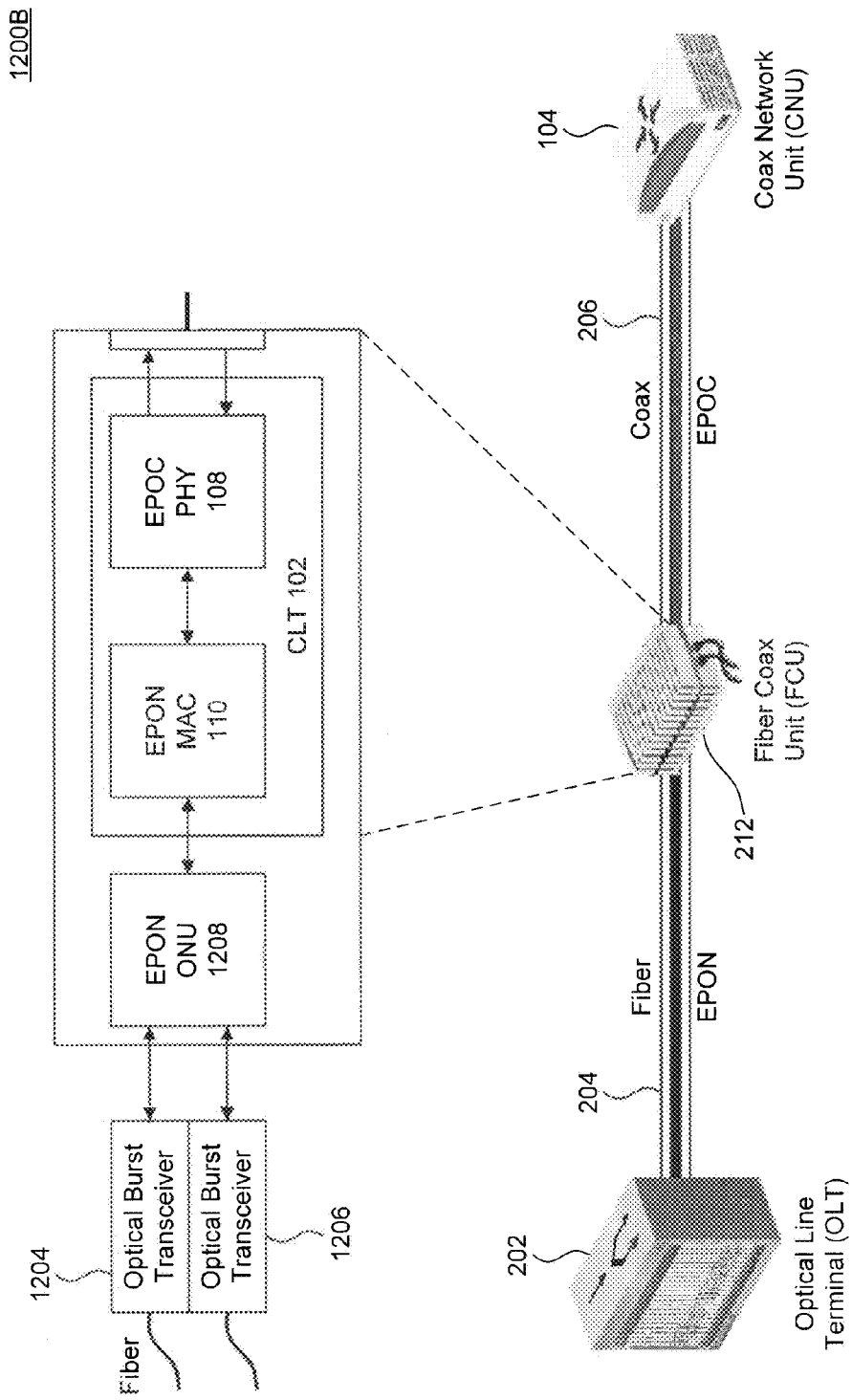
FIG. 12B illustrates another example cable network architecture according to an embodiment.

In example architecture 1200B illustrated in FIG. 12B, FCU 212 is in a bridge configuration and includes a CLT 102 and an EPON ONU 1208. CLT 102, as described above in FIG. 1, includes an EPON MAC 110 and an EPoC PHY 108. EPON ONU 1208 includes an EPON MAC and is used to establish a MAC link between OLT 202 and FCU 212. In this configuration, the EPON time grant issuance to the CNUs occurs at FCU 212, particularly at EPON MAC 110. Specifically, an upstream transmission request from a CNU, such as CNU 104, is received by CLT 102 of FCU 212. EPON MAC 110 of CLT 102 issues an EPON time grant in response to the request, and the EPON time grant is sent to CNU 104. Subsequently, CNU 104 sends data in the upstream in accordance with the issued EPON time grant. The upstream data is received by EPON MAC 110 of CLT 102 and then forwarded to EPON ONU 1208 of FCU 212. EPON ONU 1208 can then request an upstream transmission request from OLT 202, in order to deliver this upstream data to OLT 202.

Returning to FIG. 2, OLT 202 can serve multiple ONUs (not shown in FIG. 2), including EPON ONU 1208 of FCU 212, over the EPON portion of the network. For example, the multiple ONUs can share a portion of fiber 204 to communicate with OLT 202. In EPON/EPoC, the multiple ONUs share the upstream using a Time Division Multiple Access (TDMA) method, in which OLT 202 assigns each ONU a time slot in which to transmit its upstream data (upstream EPON time grant). A guard band time is typically used between upstream transmissions of different ONUs to avoid overlap of transmissions at OLT 202. In order to minimize this guard band time (and increase the upstream bandwidth), OLT 202 uses a ranging protocol to determine the round trip delay time (RTT) between itself and each of the ONUs and grants upstream transmission times for ONUs in accordance with the determined RTTs.

CNUs 104 and 210 share the upstream channel to FCU 212. Specifically, CNUs 104 and 210 use an Orthogonal Frequency Division Multiple Access (OFDMA) technique, which allows them to share the same OFDMA symbol or OFDMA frame (the OFDMA frame includes multiple time consecutive OFDMA symbols) to FCU 212. In an embodiment, a particular CNU upstream transmission (or burst) can use individual subcarriers over a portion or all the symbols in the OFDMA frame.

But with the EPON and EPoC portions of the network using different upstream access methods, a translation function is needed. For example, to transmit a data burst from CNU 104 over the EPoC portion, there is a need to translate (map) an EPON upstream time grant assigned by OLT 202 (in example architecture 1200A) or by CLT 102 (in example architecture 1200B) to OFDMA resources represented by individual subcarriers of an upstream OFDMA frame. For upstream transmission of the same data burst from FCU 212 to OLT 202, the upstream resources need to be identified and demodulated by FCU 212 to re-generate the data burst for TDMA transmission to OLT 202. In addition, with FCU 212 supporting multiple CNUs, such as CNUs 104 and 210, the translation of upstream EPON time grants to OFDMA resources must not result in CNUs using overlapping subcarriers in the same OFDMA frame. Additionally, the CNU upstream transmissions must be timed appropriately in order for them to be received within the same upstream OFDMA frame at the FCU. Further, it is desirable that a given upstream OFDMA frame shared by multiple CNUs be used (i.e., its individual subcarriers be used) efficiently among the CNUs to increase the amount of data carried by the OFDMA frame.

Embodiments as further described below include, but are not limited to, systems and methods for enabling OFDMA (or any other multi-subcarrier multiple access technique) in the upstream in an EPoC network. For example, embodiments include systems and methods for translating EPON upstream time grants to OFDMA resources represented by individual subcarriers of an upstream OFDMA frame. In an embodiment, the translation of EPON upstream time grants to OFDMA resources ensures that CNUs sharing an OFDMA frame do not use overlapping subcarriers within the frame. Embodiments further include systems and methods for timing upstream transmissions by the CNUs in order for the transmissions to be received within the same upstream OFDMA frame at the FCU. Embodiments further include systems and methods for re-generating a data burst from OFDMA resources for TDMA transmission from the FCU to an OLT. Further, embodiments include systems and methods for efficiently allocating the subcarriers of a given OFDMA frame among multiple CNUs in order to increase the amount of data carried by frame.

Figure 3:
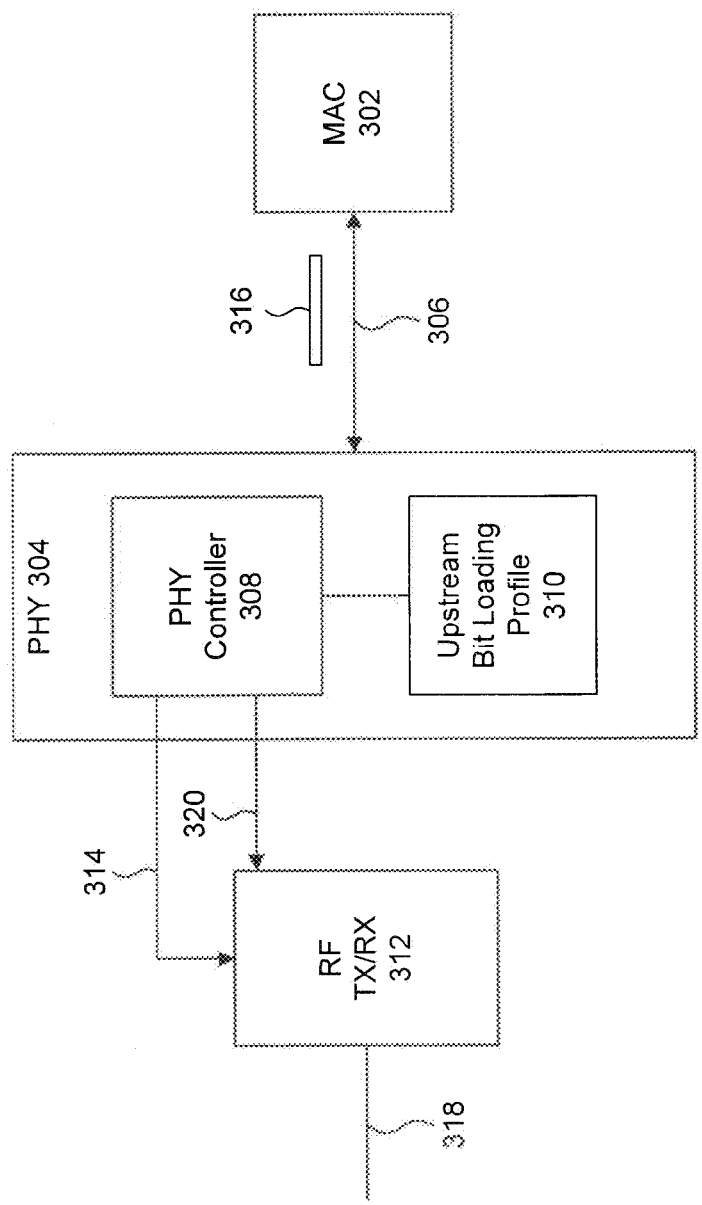
FIG. 3 illustrates an example coaxial network unit (CNU) according to an embodiment.

FIG. 3 illustrates an example coaxial network unit (CNU) 300 according to an embodiment. Example CNU 300 is provided for the purpose of illustration only and is not limiting of embodiments. Example CNU 300 can be an embodiment of CNU 104 or CNU 210 described above in FIGS. 1 and 2, and can be used, along with other similar CNUs, to form and transmit an upstream OFDMA frame to an FCU, such as FCU 212 for example.

As shown in FIG. 3, example CNU 300 includes a MAC layer 302, a PHY chip 304, a radio frequency (RF) transceiver 312. MAC layer 302 can be implemented in a chip or processor and can be an EPON MAC layer. MAC layer 302 is connected to PHY chip 304 via a MAC-PHY interface 306. MAC-PHY interface 306 can be a media independent interface (MII), such as the 10 Gigabit MII (XGMII) interface. PHY chip 304 includes, among other components, a PHY controller 308 and an upstream bit loading profile 310. RF transceiver 312 includes an RF transmitter and an RF receiver and is coupled to a coaxial cable 318.

In an embodiment, PHY controller 308 is configured to receive a MAC bit stream 316 over MAC-PHY interface 306 from MAC layer 302. MAC bit stream 316 can include one or more EPON MAC frames that represent a MAC data burst. MAC bit stream 316 can be transmitted by MAC layer 302 in response to an upstream EPON time grant, received by MAC layer 302 in response to an upstream transmission request to an OLT. In an embodiment, PHY controller 308 can determine the bit size of MAC bit stream 316 based on a start transmission time and an end transmission time of MAC bit stream 316 over MAC-PHY interface 306.

PHY controller 308 is configured to determine a transmission time duration for MAC bit stream 316 over coaxial cable 318. In an embodiment, PHY controller 308 determines the transmission time duration for MAC bit stream 316 based on the bit size of MAC bit stream 316 and upstream bit loading profile 310. Upstream bit loading profile 310 determines for each available subcarrier of an OFDMA symbol (which is defined as a plurality of subcarriers for a defined OFDMA symbol time) the number of bits that can be carried by the subcarrier in one OFMDA symbol (subcarrier symbol bit loading) when used by CNU 300 to transmit to the FCU. Typically, subcarrier bit loading can vary from subcarrier to subcarrier (especially for subcarriers that are frequency distant) and from CNU to CNU (e.g., because CNUs can have different Signal-to-Noise Ratios (SNRs) at the FCU).

In an embodiment, PHY controller 308 determines a total bit carrying capacity of an OFDMA frame. The OFDMA frame includes multiple time consecutive OFDMA symbols having a defined symbol time duration. The number of OFDMA symbols in an OFDMA frame is configurable and may be between 8 and 32, for example. PHY controller 308 then divides the total bit carrying capacity of the OFDMA frame by the OFDMA frame duration to determine an average data transmission rate from CNU 300 to the FCU. PHY controller 308 then uses the average data transmission rate to compute the transmission time duration for MAC bit stream 316 based on the bit size of MAC bit stream 316. In an embodiment, PHY controller 308 represents the transmission time duration for MAC bit stream 316 in terms of EPON Time Quantas (TQs) (each EPON TQ is equivalent to 16 nanoseconds).

PHY controller 308 is then configured to translate the transmission time duration for MAC bit stream 316 into an OFDMA frame number and a subcarrier group. In an embodiment, the frame number identifies an upstream scheduled OFDMA frame and the subcarrier group identifies a plurality of subcarriers of the upstream scheduled OFDMA frame. In an embodiment, upstream OFDMA frames are transmitted consecutively in time (with optionally an inter-frame gap (IFG)) to the FCU to form an upstream channel. Each upstream OFDMA frame has a frame number associated with it, which identifies the frame in time (i.e., identifies the frame start and end in time) to the FCU and each of the CNUs. As further described below, the subcarrier group can correspond to consecutive or non-consecutive subcarriers (in terms frequency) of the OFDMA frame. Thus, a frame number (e.g., frame #200) and a subcarrier group (e.g., subcarriers 100-150) within the frame identified by the frame number indicate unique OFDMA resources of the upstream channel to the FCU.

In an embodiment, PHY controller 308 is configured to translate the transmission time duration into the frame number and the subcarrier group based at least in part on the start transmission time of MAC bit stream 316 over MAC-PHY interface 306. In an embodiment, PHY controller 308 uses a translation function that implements a one-to-one mapping of start transmission times to upstream OFDMA resources (i.e., no two different start transmission times can result in same or overlapping OFDMA resources). In an embodiment, MAC layer 302 is synchronized with a MAC layer of the serving OLT (e.g., example architecture 1200A) or the CLT (e.g., example architecture 1200B), such that no two CNUs served by the OLT or CLT can have the same start transmission times over their respective MAC-PHY interfaces. As a result, the translation of the transmission time duration based on the start transmission time of MAC bit stream 316 over MAC-PHY interface 306 results in upstream OFDMA resources which can only be determined by example CNU 300.

Having identified the upstream OFDMA resources to carry MAC bit stream 316, PHY controller 308 is configured to map MAC bit stream 316 to the determined subcarrier group of the identified upstream OFDMA frame. In an embodiment, PHY controller 308 is configured to map MAC bit stream 316 to the subcarrier group based on upstream bit loading profile 310, assigning to each subcarrier of the subcarrier group a number of bits of MAC bit stream 316 in accordance with the symbol bit loading of the subcarrier as determined in upstream bit loading profile 310. PHY controller 308 then outputs an output signal 320 to RF transceiver 312. Output signal 320 includes, for each subcarrier of the subcarrier group, the bits mapped to the subcarrier for the next OFDMA symbol (of the OFDMA frame) to be transmitted. In an embodiment, RF transceiver 312 includes an Inverse Fast Fourier Transform (IFFT) module, which modulates each subcarrier of the subcarrier group with the respective bits mapped to it. The resulting modulated subcarriers form the OFDMA symbol to be transmitted. The same process is repeated for each OFDMA symbol in the OFDMA frame. In another embodiment, PHY controller 308 is further configured to configure RF transceiver 312 using a control signal 314 to transmit during the identified upstream OFDMA frame and on the identified subcarrier group over coaxial cable 318.

Figure 4:
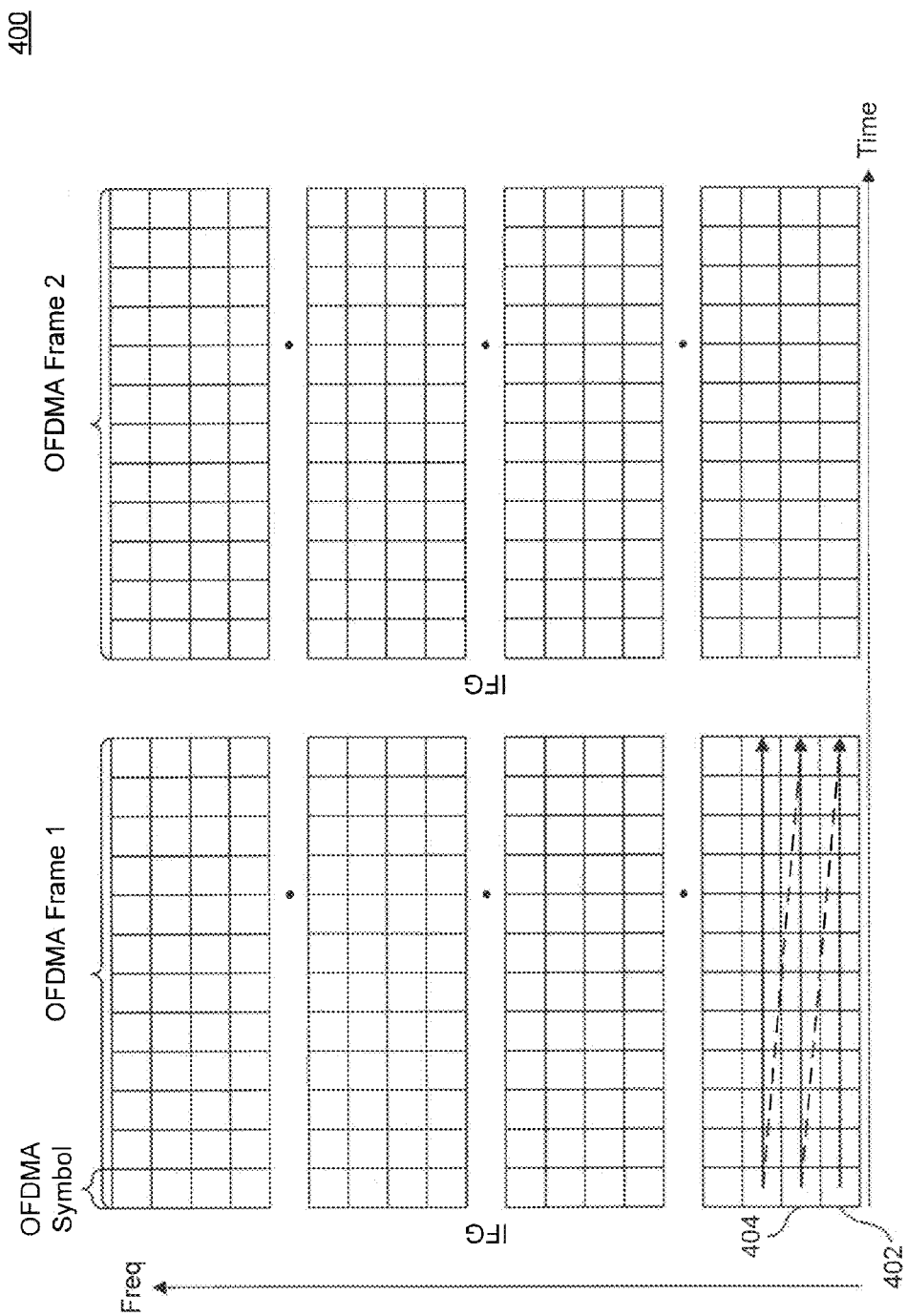
FIG. 4 is an example that illustrates an Orthogonal Frequency Division Multiple Access (OFDMA) framing approach according to an embodiment.

FIG. 4 is an example 400 that illustrates an OFDMA framing approach according to an embodiment. Example 400 is provided for the purpose of illustration only and is not limiting of embodiments. Example 400 shows two upstream OFDMA frames (OFDMA Frame 1 and OFDMA Frame 2) being transmitted consecutively in time. In an embodiment, an IFG separates consecutive OFDMA frames. Each OFDMA frame includes 12 OFDMA symbols, though the OFDMA frame can be configured to include any number of OFDMA symbols according to embodiments.

OFDMA frames are transmitted OFDMA symbol by OFDMA symbol. However, the mapping of bits (e.g., MAC bit stream 316) to OFDMA frames is done subcarrier per subcarrier as illustrated by the arrows shown in FIG. 4. For example, assuming that subcarriers are filled in an ascending order of frequency, then bits are mapped to a first subcarrier 402 across all OFDMA symbols of the OFDMA frame, before the mapping of bits to a second subcarrier 404 is performed. This mapping approach ensures that any given data codeword (e.g., Forward Error Correction (FEC) protected data block) of the MAC bit stream is spread over multiple OFDMA symbols, which reduces the effects of burst noise on any transmitted data codeword. In another embodiment, one or more OFDMA symbols in a given OFDMA frame are designated as SYNC symbols and are configured to carry a mixture of data and pilot information. The pilot information can be used by the FCU to estimate the upstream channels from the CNUs.

Returning to FIG. 3, in an embodiment, example CNU 300 can be configured to implement the OFDMA framing approach illustrated in FIG. 4. Accordingly, PHY controller 308 can be configured, for each subcarrier of the identified subcarrier group, to: determine a symbol bit loading for the subcarrier from upstream bit loading profile 310; determine, using the symbol bit loading, a total number of bits that can be carried by the subcarrier across the multiple time consecutive symbols of the OFDMA frame; and map bits from MAC bit stream 316 to the subcarrier in accordance with the total number of bits. In an embodiment, PHY controller 308 maps the bits from MAC bit stream 316 to internal registers, each corresponding to a particular subcarrier. Then, for each OFDMA symbol, PHY controller 308 outputs an appropriate number of bits from each of the internal registers (according to the symbol bit loading of the respective subcarrier) using output signal 320 to RF transceiver 312.

As described above, in addition to ensuring that CNUs served by the same FCU use non-overlapping subcarriers in an OFDMA frame, transmissions by the CNUs must be timed appropriately such that they arrive and can be received within the same upstream OFDMA frame at the FCU. With OFDMA frames having boundaries that are defined both in time and frequency by the FCU, each CNU must maintain a local OFDMA frame start time (which identifies, for example, the start of the next upstream OFDMA frame). As CNUs can be located at different distances from the FCU, the OFDMA frame start time for the same OFDMA frame can be different from one CNU to another, with the difference accounting for the difference in propagation time to reach the shared medium. This is illustrated in example 500 of FIG. 5, which illustrates upstream burst alignment according to an embodiment. Example 500 is provided for the purpose of illustration only and is not limiting of embodiments. For simplification purposes only, example 500 is described with reference to example cable network architecture 200.

Figure 5:
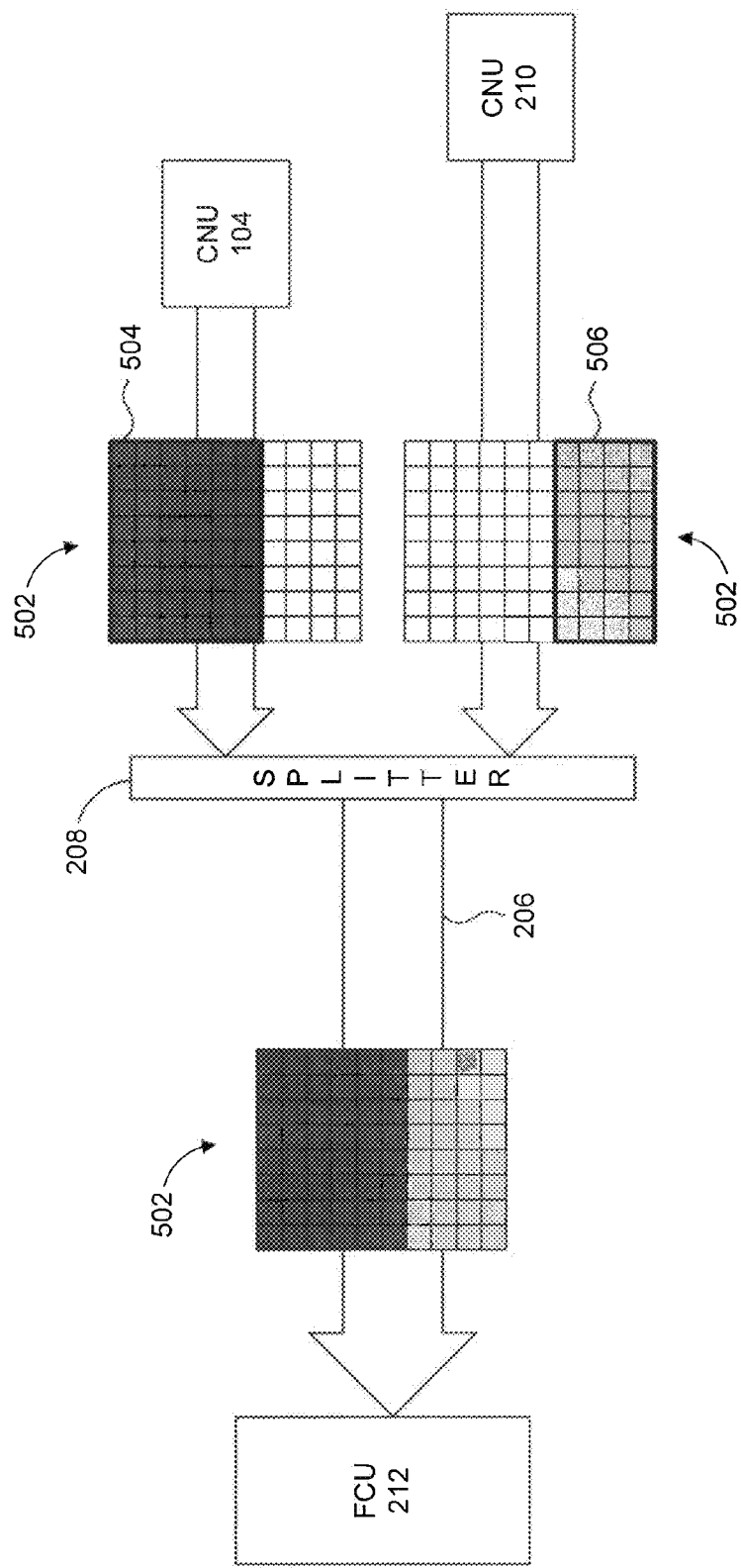
FIG. 5 is an example that illustrates upstream burst alignment according to an embodiment.

As shown in FIG. 5, CNU 104 and CNU 210 are both served by FCU 212 using a shared coaxial cable 206. For illustration, CNU 104 is assumed to be closer to FCU 212 than CNU 210 (e.g., CNU 104 is connected to splitter 208 via a shorter coaxial cable than CNU 210). In order for CNUs 104 and 210 share a same upstream OFDMA frame 502 to FCU 212 for respective bursts, CNUs 104 and 210 must transmit on non-overlapping resources 504 and 506, respectively, of OFDMA frame 502. In addition, CNU 210 must begin its burst transmission before CNU 104 such that the two transmissions align in time at splitter 208. Splitter 208 can combine the two transmissions onto coaxial cable 206 to form upstream OFDMA frame 502.

In an embodiment, FCU 212 assists each of CNUs 104 and 210 to determine their respective local OFDMA frame start times to align their transmissions in time at the first component of the shared upstream medium (splitter 208 in example 500). In an embodiment, to calibrate its respective local OFDMA frame start time, a CNU (e.g., via PHY controller 308) is configured to transmit a signal on an upstream control channel according to its local OFDMA frame start time. The upstream control channel can be transmitted on a fixed set of subcarriers outside of the data channel carrying the OFDMA frame. In an embodiment, the CNU begins transmitting the signal at its local OFDMA frame start time. When FCU 212 receives the signal on the upstream control channel, it computes a time offset between the time that the signal was received and the time that the start of the corresponding upstream OFDMA frame was received. FCU 212 then sends the time offset to the CNU on a downstream control channel. The downstream control channel can be transmitted on a fixed set of subcarriers outside of the downstream data channel. The CNU is configured to receive the time offset on the downstream control channel and to adjust the local frame start time using the time offset. By adjusting its local frame start time using the time offset, the CNU can ensure that its upstream transmissions align with the FCU defined OFDMA frame boundary.

In addition to ensuring time alignment at the PHY level such that the FCU PHY (e.g., EPoC PHY 1202 or 108) receives CNU upstream transmissions within defined OFDMA frame boundaries, embodiments are transparent to the MAC layer such that neither the CNU MAC nor the FCU MAC (e.g., EPON MAC 110) (nor the OLT EPON MAC) needs to be modified or made aware of the underlying translation of upstream EPON time grants to OFDMA resources. In an embodiment, to ensure that the MAC layers are not affected by the underlying PHY level translation, the CNU PHY maps MAC data to OFDMA resources based on a fixed delay and the FCU PHY (e.g., EPoC PHY 1202 or EPoC PHY 108) demodulates OFDMA resources and releases the resulting MAC data to the CLT MAC (e.g., EPON MAC 110) (e.g., in example architecture 1200B) or OLT MAC (e.g., in example architecture 1200A) based on a fixed delay. This results in a fixed end-to-end MAC frame delay between the CNU MAC and the CLT/OLT MAC. This is illustrated in FIG. 6 below.

Figure 6:
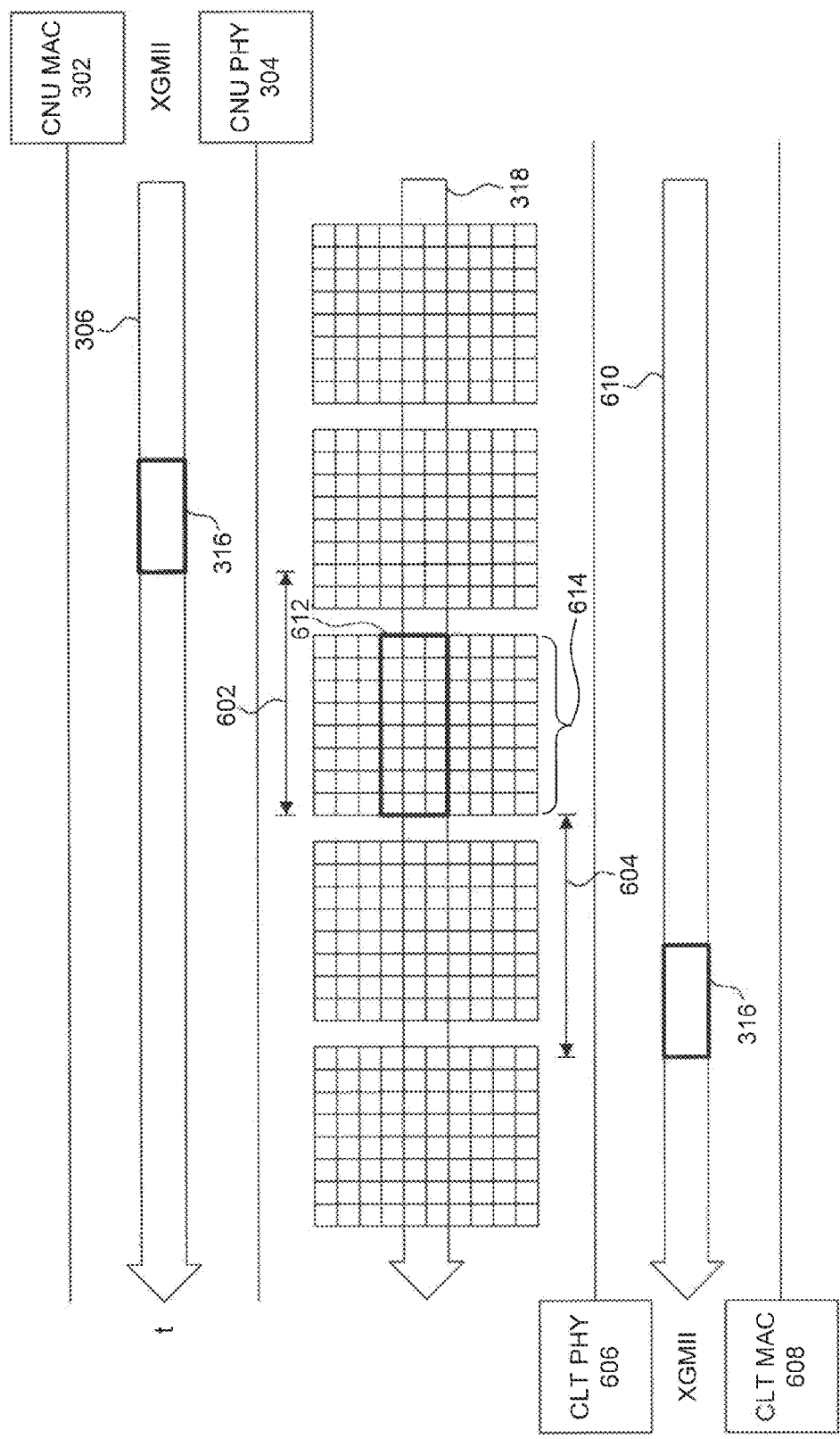
FIG. 6 is an example that illustrates the end-to-end transport of a Medium Access Control (MAC) frame from a Coaxial Network Unit (CNU) to a Coaxial Line Terminal (CLT) according to an embodiment.

FIG. 6 is an example that illustrates the end-to-end transport of MAC bit stream 316 from a CNU to a CLT according to an embodiment. MAC bit stream 316 can include one or more MAC frames, for example. As shown in FIG. 6, MAC bit stream 316 is placed by CNU MAC layer 302 on MAC-PHY interface 306. CNU PHY 304 maps MAC bit stream 316 to a subcarrier group 612 of an upstream OFDMA frame 614 and transmits the subcarrier group 612 over a coaxial cable 318 at a fixed delay 602 relative to when MAC bit stream 316 appeared on MAC-PHY interface 306. At the CLT, a CLT PHY 606 demodulates the subcarrier group 612 of OFDMA frame 614 to re-generate MAC bit stream 316. CLT PHY 606 then places MAC bit stream 316 on a MAC-PHY interface 610 for CLT MAC 608, at a fixed delay 604 relative to when OFDMA frame 614 was received. MAC bit stream 316 thus incurs a fixed end-to-end delay from CNU MAC layer 302 to CLT MAC 608, which ensures a constant data rate MAC link between the CNU and CLT.

Figure 7:
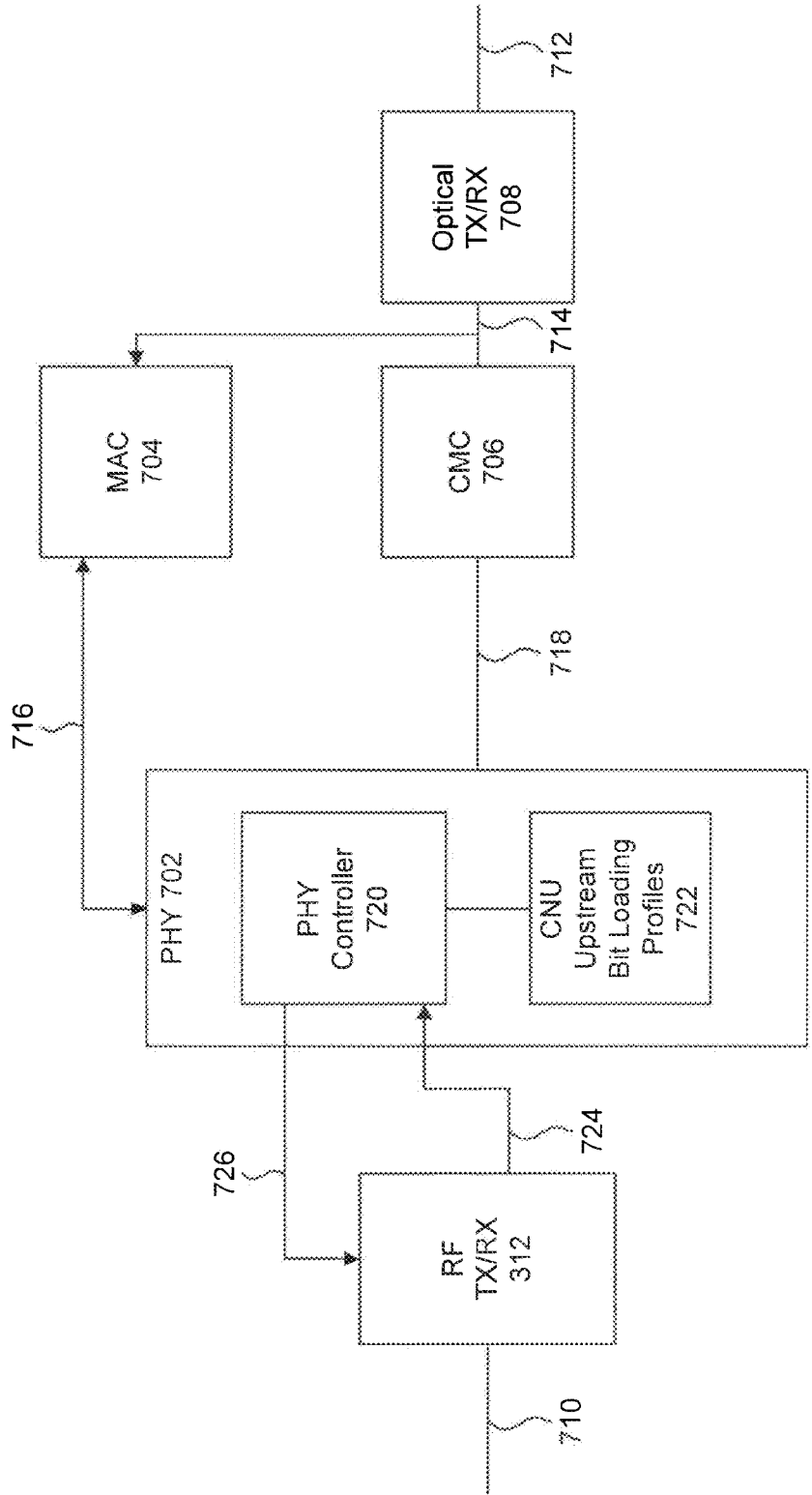
FIG. 7 illustrates an example CLT according to an embodiment.

FIG. 7 illustrates an example FCU 700 according to an embodiment. Example FCU 700 is provided for the purpose of illustration only and is not limiting of embodiments. Example FCU 700 can be an embodiment of FCU 212 described above in FIGS. 2, 12A, and 12B. As shown in FIG. 7, example FCU 700 includes a PHY chip 702, a MAC layer 704, a Coaxial Media Converter (CMC) 706, an RF transceiver 312, and an optical transceiver 708. In other embodiments, FCU 700 can include more or less components than shown in FIG. 7. For example, in accordance with example architecture 1200B, FCU 700 may not include CMC 706. In other embodiments, CMC 706 may be part of PHY chip 702, which along with MAC layer 704 can form a CLT, such as CLT 102.

MAC layer 704 can be implemented in a chip or processor and can be an EPON MAC layer. MAC layer 704 is connected to PHY chip 702 via a MAC-PHY interface 716. MAC-PHY interface 716 can be an XGMII interface. PHY chip 702 includes, among other components, a PHY controller 720 and CNU upstream bit loading profiles 722. CNU upstream bit loading profiles 722 include the upstream bit loading profiles for CNUs served by FCU 700. CMC 706 can be implemented as described in U.S. application Ser. No. 12/878,643, filed Sep. 9, 2010, which is incorporated herein by reference in its entirety. In an embodiment, CMC 706 performs PHY level conversion from EPON to EPoC, and vice versa. RF transceiver 312 includes an RF transmitter and an RF receiver and is coupled to a coaxial cable 710. Coaxial cable 710 can connect FCU 700 to one or more CNUs. Optical transceiver 708 includes an optical transmitter and an optical receiver and is coupled to a fiber optic line 712. Fiber optic line 712 can connect FCU 700 to an OLT, such as OLT 202, for example.

In an embodiment, example FCU 700 can receive an upstream OFDMA frame over coaxial cable 710. The upstream OFDMA frame can be formed from upstream transmissions of one or more CNUs as described above. For example, the upstream OFDMA frame can contain first and second upstream transmissions from first and second CNUs, such as CNUs 104 and 210, to FCU 700. The first and second transmissions are transmitted from the first and second CNUs at respective first and second upstream transmission times. The first and second upstream transmission times are provided to the first and second CNUs in respective first and second upstream EPON time grants, issued by an OLT (e.g., OLT 202 in example architecture 1200A) or by FCU 700 (by MAC layer 704) and delivered to the first and second CNUs by FCU 700.

RF transceiver 312 is configured to receive a signal that carries the upstream OFDMA frame over coaxial cable 710 and to provide an output signal 724 that represents the upstream OFDMA frame to PHY controller 720. In an embodiment, PHY controller 720 controls RF transceiver 312 using a control signal 726 in order to locate the upstream OFDMA frame in time and frequency.

PHY controller 720 is configured to act on output signal 724, which includes the upstream OFDMA frame, to identify, a first subcarrier group of the OFDMA frame carrying the first transmission from the first CNU. In an embodiment, PHY controller 720 identifies a start marker and an end marker associated with the first subcarrier group. In an embodiment, the start marker corresponds to a first subcarrier of the first subcarrier group and is filled by a sequence of bits that can be identified by PHY controller 720 of FCU 700. The end marker corresponds to the last subcarrier of the first subcarrier group and is filled by a sequence of bits that can be identified by PHY controller 720 of FCU 700. PHY controller 720 then generates a bit stream 718 using the first subcarrier group.

In an embodiment, as described above, the upstream OFDMA frame includes time consecutive OFDMA symbols. Accordingly, PHY controller 720 is further configured, for each subcarrier of the first subcarrier group, to determine a symbol bit loading for the subcarrier from an upstream bit loading profile of the first CNU (located in CNU upstream profiles 722), and to demodulate the subcarrier, using the symbol bit loading, over the multiple time consecutive OFDMA symbols of the OFDMA frame to generate a bit sequence for the subcarrier. PHY controller 720 then appends the bit sequences generated by demodulating the subcarriers of the first subcarrier group to generate bit stream 718. In an embodiment, PHY controller 720 eliminates the bits corresponding to the start and end markers in generating bit stream 718.

In an embodiment, such as when FCU 700 is used in an architecture such as example architecture 1200B, bit stream 718 is delivered over MAC-PHY interface 716 to MAC layer 704. MAC layer 704 can then send an upstream transmission request to the OLT, in order to deliver the MAC data contained in bit stream 718 to the OLT.

In another embodiment, such as when FCU 700 is used in an architecture such as example architecture 1200A, bit stream 718 is forwarded to CMC 706. In an embodiment, CMC 706 can be part of PHY 702. CMC 706 is configured to adapt bit stream 718 for optical transmission to generate an adapted bit stream 714. In an embodiment, CMC 706 is configured to adjust a PHY level encoding (e.g., line encoding) of bit stream 718 to generate bit stream 714. Optical transceiver 708 is configured to generate an optical signal using adapted bit stream 714 and to transmit the optical signal over fiber optical line 712 to the OLT.

As mentioned above, embodiments further include systems and methods for efficiently allocating the subcarriers of a given upstream OFDMA frame among multiple CNUs in order to increase the amount of data carried by the frame. In an embodiment, the allocation takes into account the upstream bit loading profiles of the multiple CNUs, such that CNUs use subcarriers with larger symbol bit loading whenever possible. In another embodiment, the subcarrier loading order (the order of subcarriers used by a CNU to map a bit stream to the subcarriers) used by one or more CNUs is adjusted for an upstream OFDMA frame based on the upstream loading profiles of CNUs transmitting during the upstream OFDMA frame. These embodiments are further described below with reference to FIGS. 8A, 8B, 9, and 10.

Figure 8A:
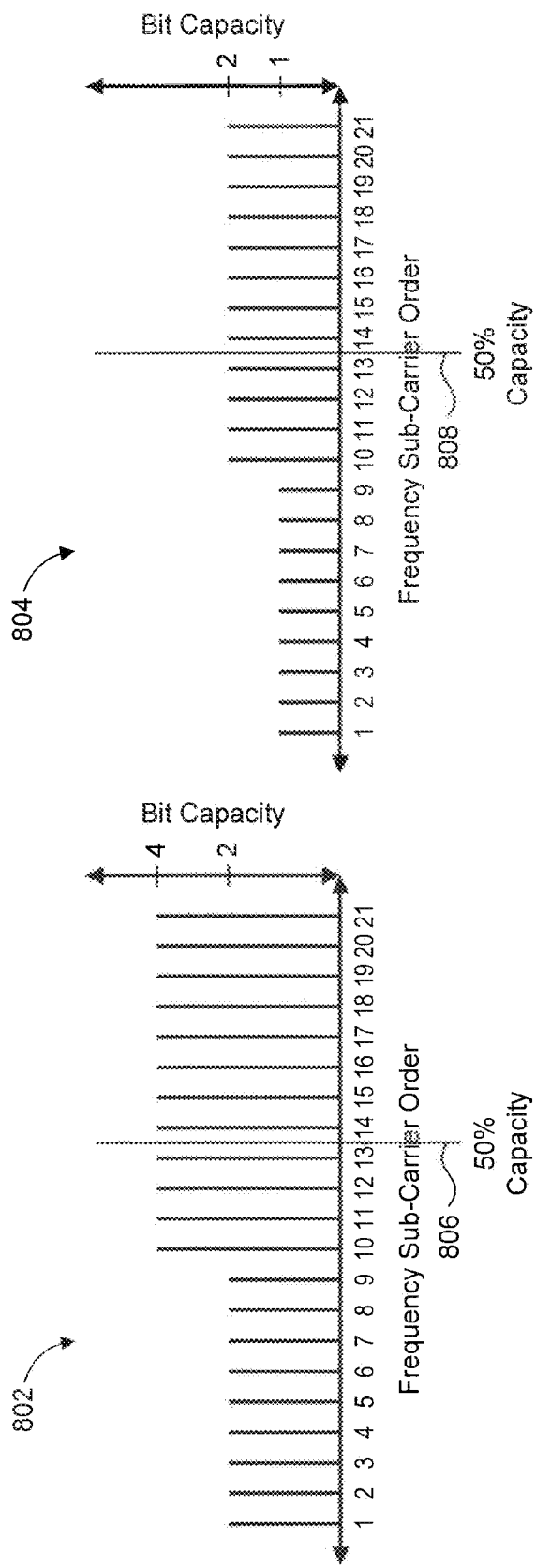
FIG. 8A illustrates example upstream bit loading profiles for CNUs according to an embodiment.

FIG. 8A illustrates example upstream bit loading profiles for CNUs according to an embodiment. Specifically, FIG. 8A shows a first upstream bit loading profile 802 and a second upstream bit loading profile 804. First upstream bit loading profile 802 can be for a first CNU, such as CNU 104, for example, and second upstream bit loading profile 804 can be for a second CNU, such as CNU 210, for example. For the purpose of illustration only, it is assumed that first and second upstream bit loading profiles 802 and 804 include 21 subcarriers, numbered from 1 to 21, which correspond to the subcarriers of an OFDMA frame. As would be understood by a person of skill in the art, an OFDMA frame can include more than 21 subcarriers in practice. Subcarrier #21 is assumed to be the lowest frequency subcarrier, followed by subcarrier #20, and so on until subcarrier #1, which is the highest frequency subcarrier.

First upstream bit loading profile 802 has a greater symbol bit loading per subcarrier than second upstream bit loading profile 804 for each of the subcarriers 1-21. Specifically, for illustration, it is assumed that the symbol bit loading of first upstream bit loading profile 802, for each subcarrier, is twice that of second upstream bit loading profile 804. For example, for subcarrier #1, the symbol bit loading is 2 bits per symbol in first upstream bit loading profile 802 and 1 bit per symbol in second upstream bit loading profile 804. Similarly, for subcarrier #10, the symbol bit loading is 4 bits per symbol in first upstream bit loading profile 802 and 2 bits per symbol in second upstream bit loading profile 804. Accordingly, the first CNU can load twice as many bits in the OFDMA frame than the second CNU if each CNU were to use the OFDMA frame exclusively.

Because first and second upstream bit loading profiles 802 and 804 are proportional to each other (related by a 2 to 1 ratio in terms of symbol bit loading per subcarrier), if the subcarriers 1-21 are filled in order (e.g., from the lowest frequency subcarrier to the highest frequency subcarrier, or vice versa) any given OFDMA frame usage capacity percentage will be reached at the same subcarrier location within the OFDMA frame using both first and second upstream bit loading profiles 802 and 804. For example, as shown in FIG. 8A, using first upstream bit loading profile 802, if subcarriers are filled consecutively starting from subcarrier #1, the OFDMA frame will reach 50% usage capacity (i.e., the OFDMA frame will be half full) once subcarrier #13 is filled as illustrated by 50% capacity line 806. Similarly, the 50% capacity line 808 for second upstream bit loading profile 804 occurs once subcarrier #13 is filled.

Because of this alignment of capacity usage percentage lines between first and second upstream profiles 802 and 804 (due to them being proportional), the first and second CNUs can be readily accommodated within the same OFDMA frame. For example, if the first and second CNUs each requested an upstream transmission equivalent to 50% capacity of an OFDMA frame, then the first CNU can use a first half (of the subcarriers) of the OFDMA frame and the second CNU can use the other half of the OFDMA frame. Similarly, if the first CNU had requested 20% of the capacity of an OFDMA frame and the second CNU had requested 30% of the capacity of the OFDMA frame, then the first CNU can use, for example, the lowest frequency subcarriers in the frame until the 20% capacity line is reached and the second CNU can use the next set of subcarriers until the 50% capacity line is reached.

Figure 8B:
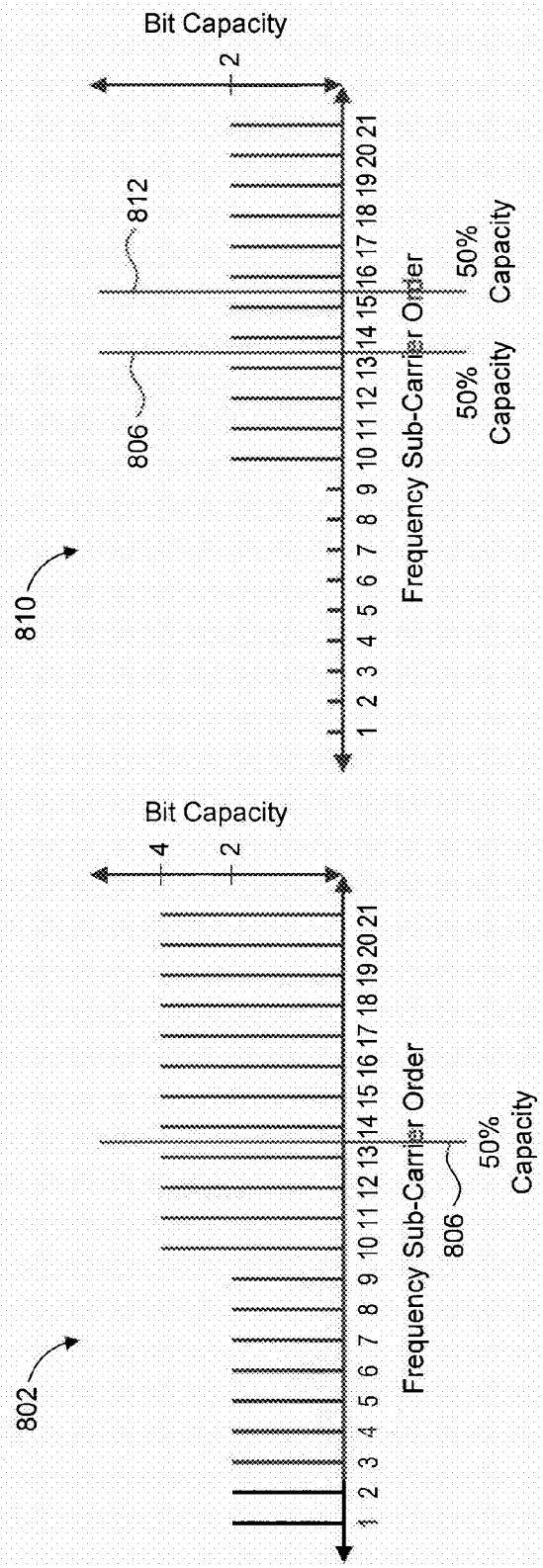
FIG. 8B illustrates example upstream bit loading profiles for CNUs according to an embodiment.

In practice, however, upstream bit loading profiles of CNUs transmitting within the same OFDMA frame are not always proportional or substantially proportional as illustrated in FIG. 8A. For example, as shown in FIG. 8B, a first CNU and a third CNU transmitting in the same OFDMA frame can have respectively first upstream bit loading profile 802 and a third upstream bit loading profile 810. Third upstream bit loading profile 810 has nulled subcarriers at subcarriers 1 through 9. As a result, upstream bit loading profiles 802 and 810 have distributions that are not proportional, and their respective capacity usage percentage lines do not match. For example, using first upstream bit loading profile 802, if subcarriers are filled consecutively starting from subcarrier #1, the OFDMA frame will reach 50% usage capacity once subcarrier #13 is filled as illustrated by 50% capacity line 806. In contrast, the 50% capacity line 812 using third upstream bit loading profile 810 is only reached after subcarrier #15 is filled.

Because of this misalignment of capacity percentage lines between first and third upstream profiles 802 and 810, the first and third CNUs are more difficult to accommodate within the same OFDMA frame. For example, if both the first and third CNUs request an upstream transmission equivalent to 50% capacity of an OFDMA frame, then the loading order of subcarriers can determine whether or not both CNUs can be accommodated in the same frame. For example, if subcarriers are filled consecutively starting from subcarrier #1 beginning with the third CNU, then the third CNU will use subcarriers 1-15. The remaining subcarriers 16-21 however do not provide the first CNU a 50% capacity because the 50% capacity line 806 for first upstream profile 802 is before subcarrier #15. Accordingly, the first CNU transmission cannot be fully accommodated within the same OFDMA frame and additional overhead is needed in order to spread the first CNU transmission over multiple OFDMA frames.

Embodiments as further described below can be used to alleviate this problem. Specifically, in an embodiment, the upstream bit loading profile of a CNU can be capacity balanced by adjusting the order in which subcarriers are filled by the CNU. This is illustrated in FIG. 9, which shows the capacity balancing of an upstream bit loading profile 902.

Figure 9:
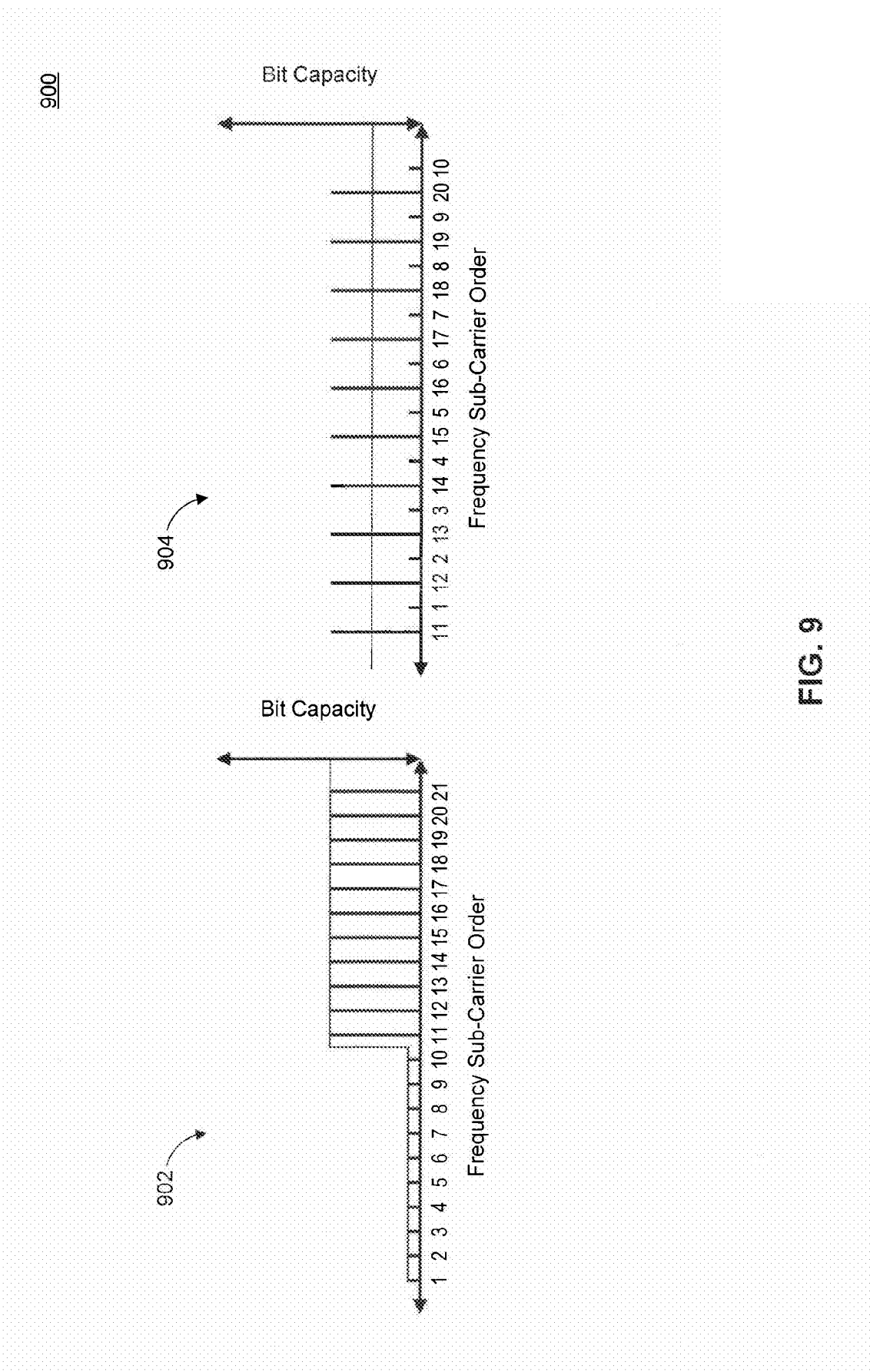
FIG. 9 is an example that illustrates capacity balancing of an upstream bit loading profile according to an embodiment.

As shown in FIG. 9, bit loading profile 902 is unbalanced with subcarriers 1-10 being nulled and unable to carry any bits, and subcarriers 11-20 each having a certain bit loading. Because of this unbalance, the CNU can only use subcarriers 11-20 or a portion thereof for any upstream transmission, which constrains the use of the subcarriers between multiple CNUs and may cause overlap between CNUs. For example, if an upstream time grant of a given start time and length (in TQs) is mapped to frequency according to profile 902, then the start time may map to some of subcarriers 1-10. However, because the CNU cannot transmit any bits on those subcarriers, it may end up transmitting on the subcarriers starting with subcarrier #11. However, this may overlap with a transmission of another CNU with the same profile and a different start time. This problem can be resolved according to two different embodiments as further described below.

In one embodiment, bit loading profile 902 can be capacity balanced by adjusting the order of subcarriers within the profile to generate a capacity balanced bit loading profile 904. Specifically, subcarriers 1-10 are interleaved with subcarriers 11-20 as shown in FIG. 9, such that the bit loading is uniform over any two consecutive subcarriers of the profile. The CNU uses bit loading profile 904 according to the adjusted subcarrier loading order, for example filling subcarrier #11, then subcarrier #1, then subcarrier #12, and so on, or vice versa starting from subcarrier #10.

In another embodiment, suitable when the CNU(s) have similar bit loading profiles, a total number of bits per OFDMA frame (frame capacity) is calculated using the bit loading profile. Each CNU then maintains a buffer that is equivalent to the OFDMA frame (with equal capacity to the calculated frame capacity). For every OFDMA frame, each CNU fills the buffer (as if it was filling the OFDMA frame, i.e., subcarrier by subcarrier) with actual data, when it has upstream MAC data to send, and with null data, when it has no upstream MAC data to send. The CNUs fill their respective buffers in a time synchronized manner such that each CNU fills the same buffer element at the same time. Each CNU PHY then maps the contents of the buffer to subcarriers and only transmits those subcarriers filled with actual data from the buffer. Because the upstream time grants from the OLT/CLT are never overlapping, at any time only one CNU can be filling actual data to subcarriers while the other CNUs will be filling null data to the same subcarriers. Additionally, only the one CNU that filled actual data to the subcarriers transmits on the subcarriers during the OFDMA frame.

Figure 10:
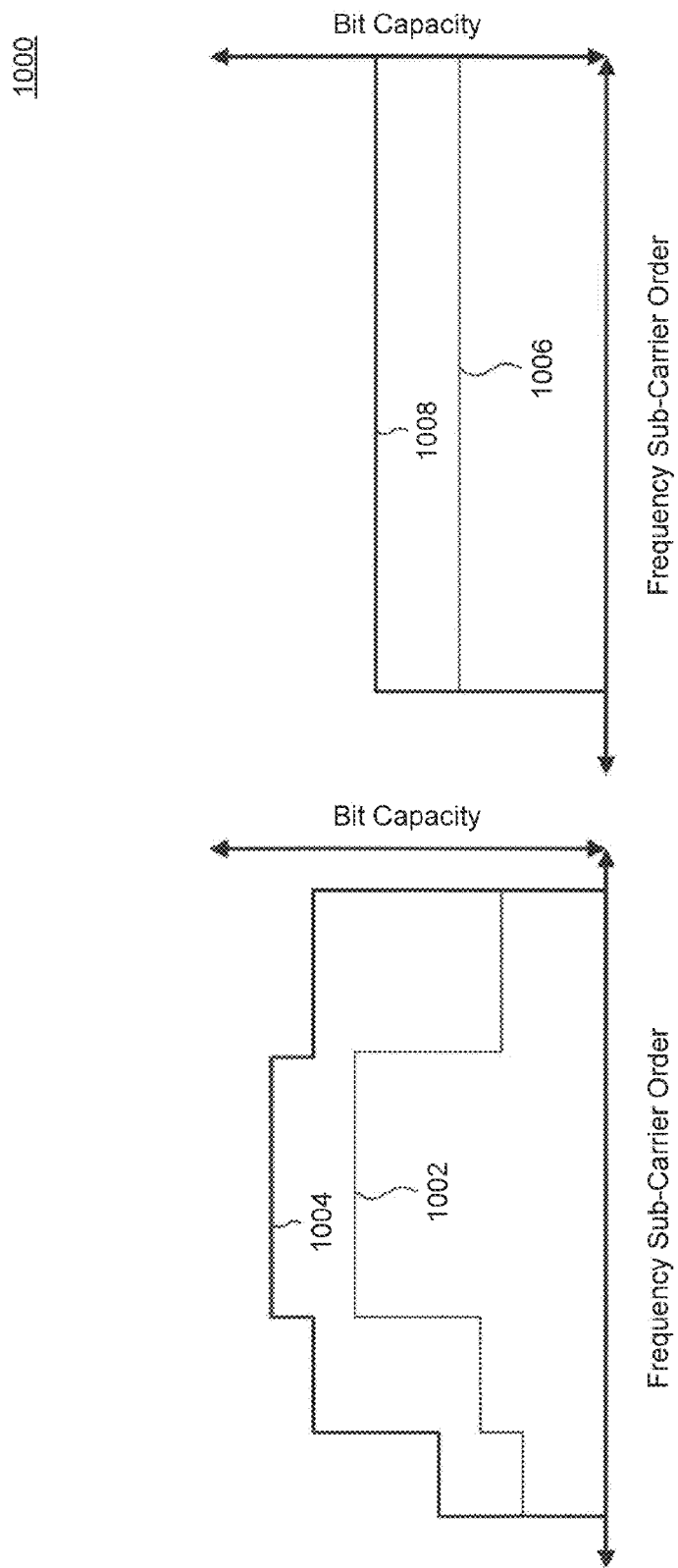
FIG. 10 is an example that illustrates capacity balancing of multiple upstream bit loading profiles according to an embodiment.

Capacity balancing can also be used even in situations in which the CNUs served by the FCU have proportional upstream bit loading profiles as described above in FIG. 8A. For example, as shown in FIG. 10, upstream bit loading profiles 1002 and 1004, while proportional to each other, are unbalanced across subcarriers. The unbalance can complicate the allocation of subcarriers to the CNUs within the same OFDMA frame. In an embodiment, profiles 1002 and 1004 can be capacity balanced to result in profiles 1006 and 1008. Profiles 1006 and 1008 remain proportional to each other but are also capacity balanced across subcarriers.

In an embodiment, as described above, capacity balancing of upstream bit loading profiles can be performed by the FCU. As described above, the FCU PHY has knowledge of the upstream bit loading profiles of CNUs that it serves. For example, the FCU can measure the upstream bit loading profile for a CNU, by measuring the SNR on each subcarrier from the CNU and calculating a symbol bit loading for each subcarrier based on the SNR measurement. In an embodiment, the FCU can compare the upstream bit loading profiles of CNUs that it serves and can decide to adjust one or more the upstream bit loading profiles to facilitate the sharing of upstream OFDMA frames by the CNUs. For example, the FCU (e.g., using a PHY controller, such as PHY controller 720) can adjust the first upstream bit loading profile of a first CNU based on a comparison of the first upstream bit loading profile with a second upstream bit loading profile of a second CNU. The adjustment can be in order to render the first and second bit loading profiles proportional to one another across subcarriers in the OFDMA frame. Alternatively or additionally, the adjustment can be in order to capacity balance the first bit loading profile across subcarriers in the OFDMA frame.

Figure 11:
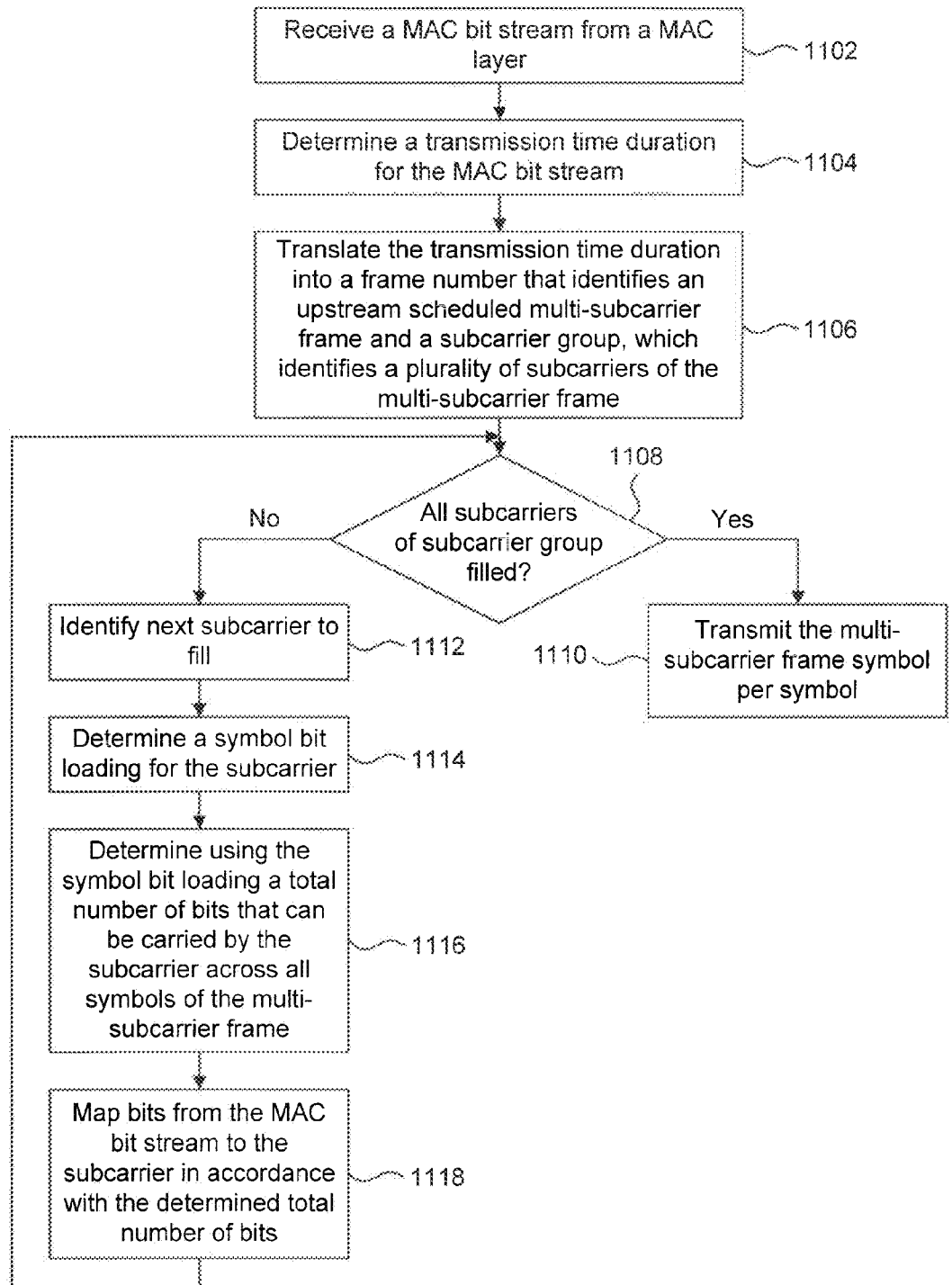
FIG. 11 illustrates an example process according to an embodiment.

FIG. 11 illustrates an example process 1100 according to an embodiment. Example process 1100 is provided for the purpose of illustration only and is not limiting of embodiments. Example process 1100 can be performed by a CNU, such as example CNU 300, in order to map a MAC bit stream to an upstream scheduled multi-subcarrier frame. In an embodiment, the multi-subcarrier frame includes an OFDMA frame that includes a plurality of time consecutive OFDMA symbols.

As shown in FIG. 11, process 1100 begins in step 1102, which includes receiving a MAC bit stream. In an embodiment, the MAC bit stream is received from a MAC layer via a MAC-PHY interface, such as an XGMII interface. Subsequently, process 1100 proceeds to step 1104, which includes determining a transmission time duration for the MAC bit stream. In an embodiment, step 1104 includes determining the transmission time duration for the MAC bit stream based on a bit size of the MAC bit stream and an upstream bit loading profile. The upstream bit loading profile determines for each available subcarrier of the multi-subcarrier frame the number of bits that can be carried by the subcarrier in one symbol of the frame.

Process 1100 then proceeds to step 1106, which includes translating the transmission time duration into a frame number that identifies an upstream scheduled multi-subcarrier frame and a subcarrier group, which identifies a plurality of subcarriers of the multi-subcarrier frame. Then, in step 1108, process 1100 includes determining whether or not all subcarriers of the subcarrier group have been filled with respective bits of the MAC bit stream. If the answer is yes, process 1100 proceeds to step 1110, which includes transmitting the multi-subcarrier frame, symbol per symbol. Otherwise, process 1100 proceeds to step 1112.

Step 1112 includes identifying the next subcarrier of the subcarrier to fill with bits from the MAC bit stream. The next subcarrier may or may correspond to the next subcarrier in frequency of the subcarrier group. For example, as described above in FIGS. 9 and 10, the filling order of subcarriers can be shuffled according to embodiments to result in capacity balanced upstream bit loading profiles for CNUs.

Process 1100 then proceeds to step 1114, which includes determining a symbol bit loading for the subcarrier, where the symbol bit loading indicates a number of bits that can be carried by the subcarrier in one symbol time. In an embodiment, the symbol bit loading is determined from the upstream bit loading profile. Then, in step 1116, process 1100 includes determining, using the symbol bit loading, a total number of bits that can be carried by the subcarrier across the multiple time consecutive symbols of the multi-subcarrier frame. Process 1100 then proceeds to step 1118, which includes mapping bits from the MAC bit stream to the subcarrier in accordance with the total number of bits determined in step 1116. Process 1100 then returns to step 1108.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. An Ethernet Passive Optical Network over Coax (EPoC) physical layer (PHY) chip for use in a Coaxial Network Unit (CNU), comprising:
   a PHY controller configured to receive a Medium Access Control (MAC) bit stream, determine a transmission time duration for the MAC bit stream, and translate the transmission time duration into a frame number and a subcarrier group, wherein the frame number identifies an upstream scheduled multi-subcarrier frame and the subcarrier group identifies a plurality of subcarriers of the multi-subcarrier frame.

2. The EPoC PHY chip of claim 1, wherein the PHY controller is configured to receive the MAC bit stream from a MAC layer via a MAC-PHY interface.

3. The EPoC PHY chip of claim 2, wherein the PHY controller is configured to determine the transmission time duration for the MAC bit stream based on a bit size of the MAC bit stream and an upstream bit loading profile.

4. The EPoC PHY chip of claim 3, wherein the PHY controller is configured to determine the bit size of the MAC bit stream based on a start transmission time and an end transmission time of the MAC bit stream over the MAC-PHY interface.

5. The EPoC PITY chip of claim 4, wherein the PHY controller is configured to translate the transmission time duration into the frame number and the subcarrier group based on the start transmission time of the MAC bit stream over the MAC-PHY interface.

6. The EPoC PHY chip of claim 1, wherein the multi-subcarrier frame includes an Orthogonal Frequency Division Multiple Access (OFDMA) frame comprising a plurality of time consecutive OFDMA symbols.

7. The EPoC PHY chip of claim 1, wherein the PHY controller is further configured to map the MAC bit stream to the subcarrier group based on an upstream bit loading profile.

8. The EPoC PHY chip of claim 7, wherein the multi-subcarrier frame comprises multiple time consecutive symbols, and wherein the PHY controller is further configured to:
   determine a symbol bit loading for a subcarrier of the subcarrier group from the upstream bit loading profile, wherein the symbol bit loading indicates a number of bits that can be carried by the subcarrier in one symbol time;
   determine, using the symbol bit loading, a total number of bits that can be carried by the subcarrier across the multiple time consecutive symbols of the multi-subcarrier frame; and
   map bits from the MAC bit stream to the subcarrier in accordance with the total number of bits.

9. The EPOC PHY chip of claim 1, wherein the PHY controller is further configured to:
 transmit a signal on an upstream control channel according to a local frame start time;
 receive a time offset on a downstream control channel; and
 adjust the local frame start time using the time offset.

10. A method, comprising:
 receiving a Medium Access Control (MAC) bit stream;
 determining a transmission time duration for the MAC bit stream; and
 translating the transmission time duration into a frame number and a subcarrier group, wherein the frame number identifies an upstream scheduled multi-subcarrier frame and the subcarrier group identifies a plurality of subcarriers of the multi-subcarrier frame.

11. The method of claim 10, wherein determining the transmission time duration for the MAC bit stream comprises determining the transmission time duration for the MAC bit stream based on a bit size of the MAC bit stream and an upstream bit loading profile.

12. The method of claim 10, wherein the multi-subcarrier frame includes an Orthogonal Frequency Division Multiple Access (OFDMA) frame comprising a plurality of time consecutive OFDMA symbols.

13. The method of claim 10, wherein the multi-subcarrier frame comprises multiple time consecutive symbols, and wherein the method further comprises:
 determining a symbol bit loading for a subcarrier of the subcarrier group, wherein the symbol bit loading indicates a number of bits that can be carried by the subcarrier in one symbol time;
 determining, using the symbol bit loading, a total number of bits that can be carried by the subcarrier across the multiple time consecutive symbols of the multi-subcarrier frame; and
 mapping bits from the MAC bit stream to the subcarrier in accordance with the total number of bits.

14. The method of claim 10, further comprising:
 transmitting a signal on an upstream control channel according to a local frame start time;
 receiving a time offset on a downstream control channel; and
 adjusting the local frame start time using the time offset.

15. An Ethernet Passive Optical Network over Coax (EPoC) physical layer (PHY) chip for use in a Coaxial Network Unit (CNU), comprising:
 a Medium Access Control (MAC) layer configured to output a MAC bit stream over a MAC-PHY interface; and
 a PHY controller configured to receive the MAC bit stream via the MAC-PHY interface, determine a transmission time duration for the MAC bit stream, and, based on a start transmission time of the MAC bit stream over the MAC-PHY interface, translate the transmission time duration into a frame number and a subcarrier group.

16. The EPoC PHY chip of claim 15, wherein the MAC layer is synchronized with a serving optical line terminal (OLT) MAC layer.

17. The EPoC PHY chip of claim 15, wherein the frame number identifies an upstream scheduled multi-subcarrier frame and the subcarrier group identifies a plurality of subcarriers of the upstream scheduled multi-subcarrier frame.

18. The EPoC PHY chip of claim 15, wherein the PHY controller is configured to determine the transmission time duration for the MAC bit stream based on a bit size of the MAC bit stream and an upstream bit loading profile.

19. The EPoC PHY chip of claim 17, wherein the upstream scheduled multi-subcarrier frame includes an Orthogonal Frequency Division Multiple Access (OFDMA) frame comprising a plurality of time consecutive OFDMA symbols.

20. The EPoC PHY chip of claim 15, wherein the PHY controller is further configured to map the MAC bit stream to the subcarrier group based on an upstream bit loading profile.

* * * * *

UNITED STATES PATENT AND TRADEMARK OFFICE
CERTIFICATE OF CORRECTION

PATENT NO. : 9,253,554 B2
APPLICATION NO. : 14/029180
DATED : February 2, 2016
INVENTOR(S) : Goswami et al.

Page 1 of 1

It is certified that error appears in the above-identified patent and that said Letters Patent is hereby corrected as shown below:

In the Claims

Column 14, Line 42. Please replace "PITY" with --PHY--.

Signed and Sealed this
Third Day of May, 2016

Michelle K. Lee
*Director of the United States Patent and Trademark Office*